United States Patent [19]

Delfeld

[11] Patent Number: 4,990,923
[45] Date of Patent: Feb. 5, 1991

[54] TEST PYLON HAVING LOW RADAR CROSS SECTION

[75] Inventor: Thomas P. Delfeld, Seattle, Wash.

[73] Assignee: The Boeing Company, Seattle, Wash.

[21] Appl. No.: 375,142

[22] Filed: Jun. 29, 1989

[51] Int. Cl.$^5$ ............................................. G01S 7/40
[52] U.S. Cl. ......................................... 342/165; 342/4
[58] Field of Search ................... 342/165, 175, 1–4; 248/160, 123, 398, 371

[56] References Cited

U.S. PATENT DOCUMENTS

| | | | |
|---|---|---|---|
| 2,602,924 | 7/1952 | Schmitt et al. | 342/360 |
| 3,274,597 | 9/1966 | Archer et al. | 342/360 |
| 4,019,699 | 4/1977 | Wintersdorff et al. | 342/2 |
| 4,713,667 | 12/1987 | Poirier et al. | 342/1 X |

Primary Examiner—Gilberto Barrón, Jr.
Attorney, Agent, or Firm—Seed and Berry

[57] ABSTRACT

A pylon for supporting a test target in an anechoic chamber during a radar cross section measurement. The pylon includes an elongated support extending upwardly from a base to a tip on which the test target is mounted. The support inclines and curves in the direction of an interrogating radar signal, and its tip is smoothly faired to the test target. The tip is formed from a resilient, radar-absorbing material, and it is bent by internal actuating means to vary the angular orientation of the test target.

9 Claims, 2 Drawing Sheets

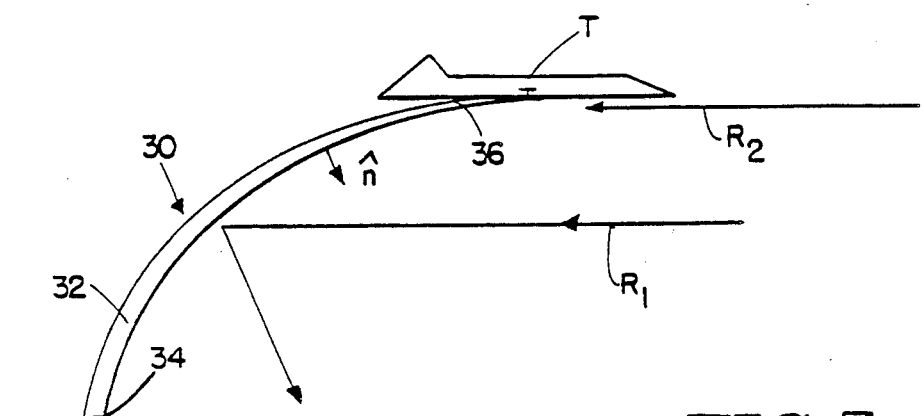
FIG.5
FIG.4
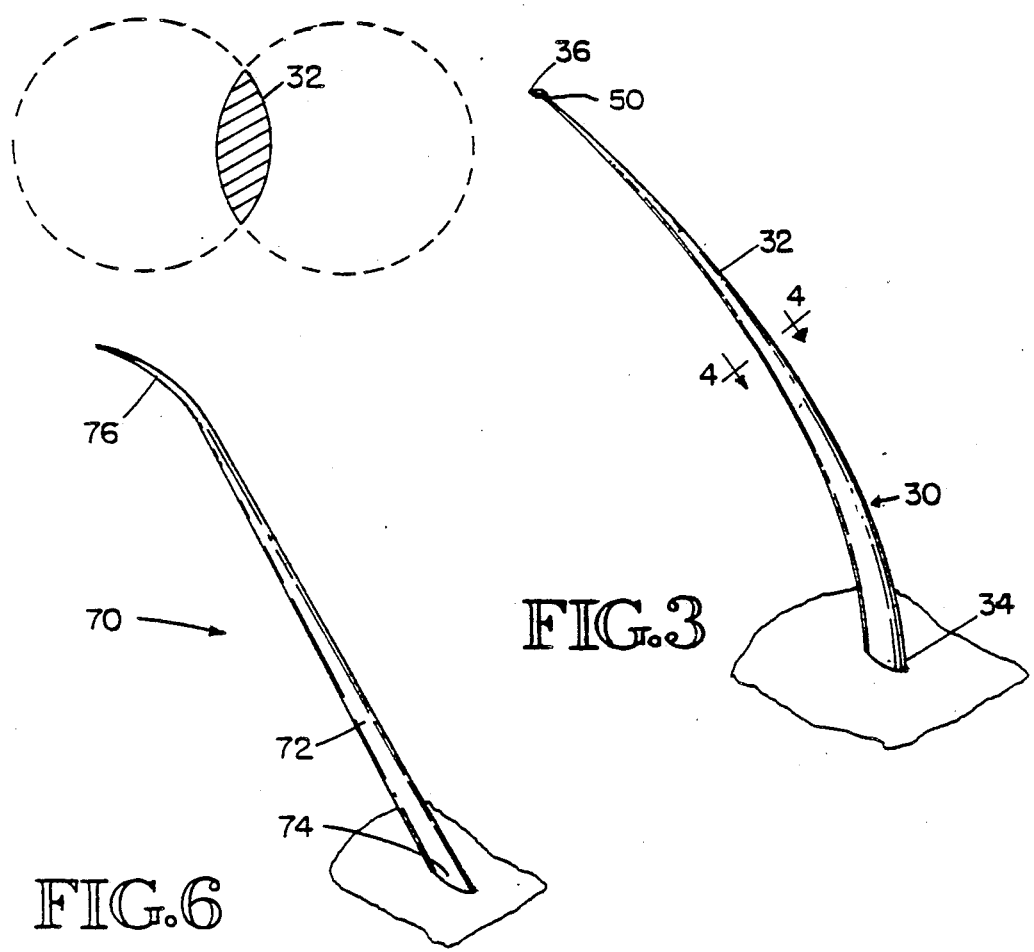
FIG.3
FIG.6

TEST PYLON HAVING LOW RADAR CROSS SECTION

FIELD OF THE INVENTION

This invention relates to the field of measuring the radar cross section of test targets, and more particularly to a test target support pylon that reflects a very low percentage of a radar signal interrogating the target during a radar cross section measurement and which allows the angular orientation of the target to be varied.

BACKGROUND ART

Aircraft radar cross section is becoming an increasingly important parameter in the design of military aircraft. All aircraft reflect interrogating radar signals. However, it is important that the magnitude of the radar reflectivity, or radar cross section, be minimized to make military aircraft less observable to various types of radars. The radar cross section of an aircraft is typically measured by placing a scale model of the aircraft in an anechoic chamber having radar absorbing walls, interrogating the model with a pulsed radar signal and measuring the magnitude of the radar signal reflected from the model. The model, also known as a test target, is generally supported in the anechoic chamber by either several downwardly extending strings or an upwardly extending pylon. Regardless of whether the test is supported by strings or a pylon, it is critical that the strings or pylon have a lower radar cross section than the test target. Otherwise, the magnitude of the measured radar reflections provides an indication of the radar cross section of the strings or pylon rather than the radar cross section of the test target. At relatively low frequencies, it is generally preferable to support the test target with strings since the radar cross section of strings is generally lower than that of pylons at low frequencies. At higher frequencies, the radar cross section of a pylon is generally significantly less than the radar cross section of strings. Thus, at the relatively high frequency at which many radar systems operate, it is preferable to utilize a pylon to support the test target.

Conventional pylons for supporting a test target in an anechoic chamber are generally in the form of an elongated inclined support or column terminating in a tip on which the test target is mounted. The test target is generally mounted on the tip of the pylon through a rotator to rotate the test target around its yaw axis. The test target is also mounted on an actuator that rotates the test target about its pitch axis. The support is generally tapered from its base to the tip, and it is generally ogival in cross section. Such pylons are manufactured, for example, by Scientific Atlanta Company.

The radar cross section of conventional pylons for supporting test targets is typically −30 dBsm at 2 GHz. At lower frequencies, the radar cross section of these pylons increases rapidly to about −20 dBsm at 1 GHz. The pylons are typically coated with a radar-absorbing material to improve the low frequency performance, but the improvement is generally no more than about 2–5 dB. As frequency increases, the radar cross section of conventional pylons improves to about −50 dBsm at 8 GHz, and radar-absorbing coatings can improve this performance about 15–20 dB.

While the conventional pylon described above has in the past proven satisfactory for most applications, it is becoming more and more inadequate as the radar cross section of new aircraft designs continues to decrease. More specifically, the radar cross section of test targets simulating modern, low observable aircraft is approaching the radar cross section of the pylon so that it is becoming impossible to measure the radar cross section of the test target alone. The principal contributor to the radar cross section of the pylon is the interface between the pylon and test target. At low frequencies, the finite length of the pylon causes diffraction to be generated at the pylon/target interface. As frequency increases, diffraction becomes less important but surface roughness effects limit the radar cross section performance of the pylon. There is thus a need for a low radar cross section pylon that is capable of supporting a large, heavy test target at a variety of angular orientations.

DISCLOSURE OF THE INVENTION

It is an object of the invention to provide a pylon for supporting a test target during a radar cross section measurement that reflects far less radar energy than the test target.

It is another object of the invention to provide a pylon for supporting a test target in a manner that allow the angular orientation of the test target to be varied without substantially increasing the radar cross section of the pylon.

It is still another object of the invention to provide a low radar cross section pylon that can be easily adopted to support specified maximum test target weights.

These and other objects of the invention are provided by a pylon for supporting a test target during a radar cross section measurement. The pylon is formed by an elongated support extending upwardly from a base to a tip on which the test is mounted. The support is inclined toward an interrogating radar signal, and the tip of the support curves smoothly toward the interrogating radar signal. The support is also preferably smoothly faired to the test target to minimize the radar cross section of the pylon. The tip of the support may be formed from a flexible material that is preferably radar absorbent. The tip may then be bent by an actuator to vary the angular orientation of the test target about the pitch, roll and/or axes. The support is preferably ogival in cross section and coated with a radar-absorbing material to minimize the reflection of radar signals from the support.

BRIEF DESCRIPTION OF THE DRAWINGS

FIG. 3 is an isometric view of one embodiment of the inventive low radar cross section pylon for supporting a test target during a radar cross section measurement.

FIG. 4 is a cross-sectional view of the inventive pylon taken along the line 4—4 of FIG. 3.

FIG. 5 is a schematic illustrating the operation of the embodiment of the inventive pylon of FIGS. 3 and 4.

FIG. 6 is an isometric view of an alternative embodiment of the inventive low radar cross section pylon for supporting a test target during a radar cross section measurement.

BEST MODE FOR CARRYING OUT THE INVENTION

Figure 1:
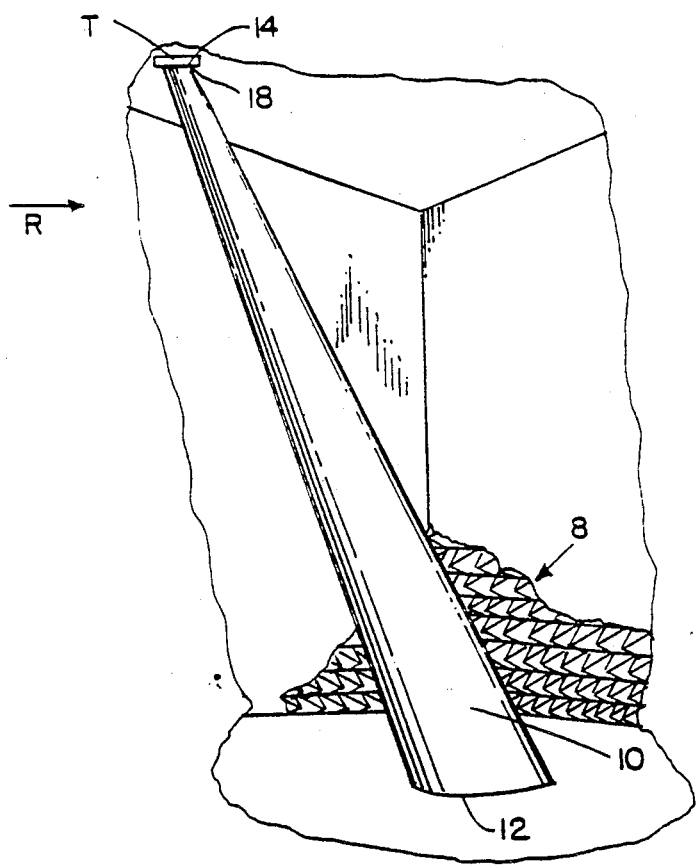
FIG. 1 is an isometric view of conventional prior art low radar cross section pylon for supporting a test target during a radar cross section measurement.

As best illustrated in FIG. 1, a conventional pylon 8 for supporting a test target during a radar cross section measurement is in the form of an elongated support 10 or column extending upwardly from a base 12 to a tip 14 on which the test target T is mounted. The elongated support 10 is inclined toward the interrogating radar signal R, and it tapers inwardly from the base 12 to the tip 14. The support 10 is ogival in cross section, i.e., it has the shape of the overlap of two intersecting circles. The support 10 is preferably coated with a conventional radar-absorbing coating. The pylon 8 illustrated in FIG. 1 is the type manufactured by the Scientific Atlanta Company. It is conventionally used in a radar anechoic chamber having radar-absorbing walls.

In operation, the test target T is mounted on the tip 14 of the pylon 10 and interrogated with a pulsed radar signal. The radar signal reflected by the test target T is then received and measured during a range gate corresponding to the round trip time from the radar system to the test target T. The pulse-width of the interrogating radar signal and the geometric relationships in the anechoic chamber are selected so that the only significant reflections of the pulsed radar signal during the range gate are from the test target T. The sharp leading edge of the support 10 is capable of reflecting very little of the radar signal since most of the radar signal is deflected to the side by the curved side walls of the support 10. The minor amount of radar signal reflected from the sharp leading edge of the support 10 is reflected downwardly to the radar-absorbing floor of the anechoic chamber because the leading edge of the pylon is inclined. The test target T is generally mounted on the tip 14 of the pylon through a conventional actuating mechanism 18 that is able to rotate the test target T about its pitch and yaw axes in order to measure the radar cross section of the test target from all angles.

Figure 2:
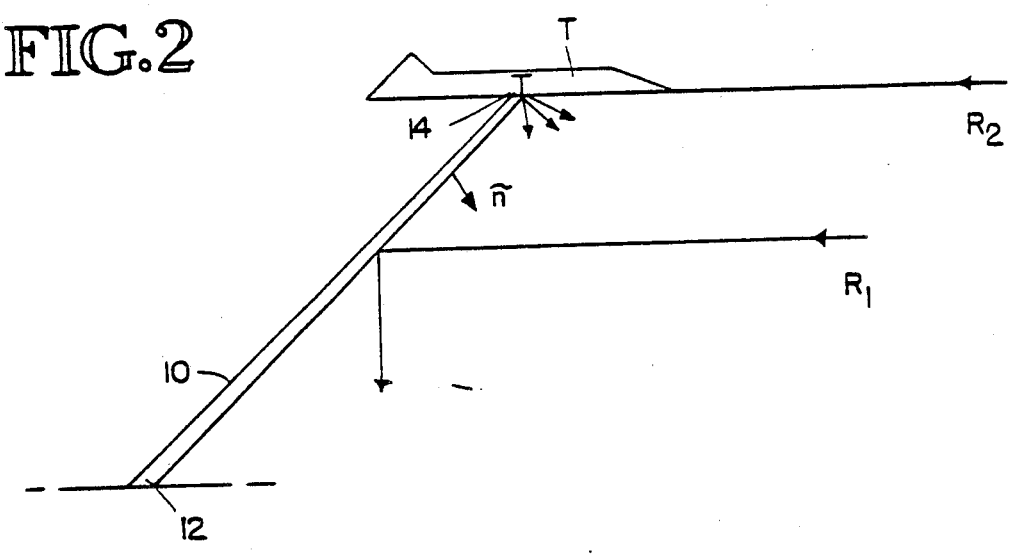
FIG. 2 is a schematic illustrating the operation of a prior art pylon of FIG. 1.

The theory of the conventional test target pylon of FIG. 1 is best illustrated with reference to FIG. 2. As explained above, the radar signal R1 incident on the sharp leading edge of the pylon 8 is reflected downwardly as illustrated in FIG. 2. However, a radar signal R1 incident on the pylon 8 at the pylon/test interface is reflected back over a wide arc due to the sloped discontinuity at the interface between the pylon 8 and test target. More specifically, the abrupt nature in which induced surface currents terminate at the test target are responsible for the back scattering of the radar signal. The current on the surface of the pylon 8 are related to the total magnetic field on the surface of the pylon through the expression:

"$K = n \times H$"

Where K is the surface current density, n is a unity vector normal to the leading edge of the pylon 8, and H is the magnetic field.

The above expression states that the surface current lies in a direction perpendicular to n and H and has a magnitude that is proportional to the sine of the angle between n and H. The incident magnetic field is always perpendicular to the direction of propagation. Any discontinuity on the surface current will produce scattering of radar energy.

One embodiment of the inventive pylon 30 is illustrated in FIG. 3. The pylon 30 includes an elongated support 32 extending upwardly from a base 34 to a tip 36 on which a test target T is mounted. The support 32 is curved toward the interrogating radar signals, R1, R2. Significantly, the tip 36 of the pylon 30 is smoothly faired into the test target T. As a result, there is no discontinuity in the surface of the pylon 30 at the pylon/target interface. The lack of any discontinuity creates a smooth current distribution at the tip of 36 of the pylon 30 thereby preventing the radar signal from being backscattered as illustrated with respect to the conventional pylon in FIG. 2. The curvature of the pylon 30 is chosen to have a maximum number of zero derivatives at the pylon tip and no discontinuities, i.e., abrupt changes in the surface of the pylon 30, throughout its length.

The inventive pylon 30 illustrated in FIG. 3 may have a fixed, non-movable tip 36 which is incapable of varying the angular orientation of the test target. However, the tip 36 is preferably formed of a conventional, flexible, radar-absorbing material such as flexible material loaded with electrically (or magnetically) lossy material. The tip 36 preferably provided with an actuating mechanism 50 of conventional design to vary the pitch and yaw axis of the test target T. As the pitch and yaw of the test target varies, it bends the flexible end of the tip since the tip 36 and test target remain in contact with each other.

Another embodiment of the inventive pylon is illustrated in FIG. 6. The embodiment of FIG. 6 utilizes a pylon 70 having an elongated support 72 extending upwardly from a base 74 to a tip 76. Unlike the embodiment of FIG. 3, the pylon 70 of FIG. 6 is not curved throughout its length. Instead, the major portion of the elongated support 72 is straight as in the prior art pylon illustrated in FIG. 1. However, the upper portion of the inventive pylon 70 curves toward the interrogating radar signal R at its tip 76. It is important that there be no slope discontinuity on the surface of the elongated support 72 in order to provide a smooth current distribution of the surface of the support 72 and thereby minimize radar back scattering. The pylon 70 in FIG. 6, like the pylon 30 of FIG. 3, has an ogive cross section, as illustrated in FIG. 4. As in the pylon 30 of FIG. 3, the tip of the pylon 70 may be fabricated of a flexible, radar-absorbing material.

The inventive pylon is thus capable of supporting large, heavy targets while producing a radar cross section that is well below the radar cross section of the test target. furthermore, the pylon is capable of maintaining this low radar cross section while the tip deflects to vary the angular orientation of the test target.

I claim:

1. A pylon for supporting a test target during a radar cross section measurement, said pylon comprising an elongated support extending upwardly from a base to a tip on which said test target is mounted, said support being inclined in a first direction toward an interrogating radar signal, substantially the entire length of said support, including said tip curving smoothly in said first direction with said support being smoothly faired to said test target at said tip so that said pylon has a relatively low radar cross section.

2. A pylon form supporting a test target during a radar cross section measurement, said pylon comprising an elongated support extending upwardly from a base to a flexible tip on which said test target is mounted, said support being inclined in a first direction toward an interrogating radar signal, the tip of said support curving smoothly in said first direction with said support being smoothly faired to said test target at said tip so that said pylon has a relatively low radar cross section, said pylon further including acutator means for bending the tip of said support to vary the angular orientation of said test target.

3. The pylon of claim 2 wherin said actuator means varies the angular orientation of said test target about its pitch axis.

4. The pylon of claim 2 wherein said actuator means varies the angular orientation of said test target about its yaw axis.

5. The pylon of claim 2 wherein said tip is formed of a flexible, radar-absorbing material.

6. A pylon for supporting a test target during a radar cross section measurement, said pylon comprising an elongated support extending upwardly from a base to a flexible tip on which said test target is mounted, said support being inclined in a first direction toward an interrogation radar signal, said pylon further including actuator means for bending the tip of said support to vary the angular orientation of said test target.

7. The pylon of claim 6 wherein said actuator means varies the angular orientation of said test target about its pitch axis.

8. The pylon of claim 6 wherein said actuator means varies the angular orientation of said test target about its yaw axis.

9. The pylon of claim 6 wherein said tip is formed of a flexible, radar-absorbing material.

* * * * *

UNITED STATES PATENT AND TRADEMARK OFFICE
CERTIFICATE OF CORRECTION

PATENT NO.　 :　 4,990,923

DATED　　 :　 February 5, 1991

INVENTOR(S) :　 Thomas P. Delfeld

It is certified that error appears in the above-identified patent and that said Letters Patent is hereby corrected as shown below:

In column 6, claim 6, line 2, please delete "interrogation" and substitute therefor --interrogating--.

Signed and Sealed this

Thirtieth Day of June, 1992

*Attest:*

DOUGLAS B. COMER

*Attesting Officer*　　　Acting Commissioner of Patents and Trademarks